(12) United States Patent
Wang

(10) Patent No.: US 11,929,960 B2
(45) Date of Patent: Mar. 12, 2024

(54) RESOURCE ALLOCATION METHOD AND DEVICE, STORAGE MEDIUM AND TERMINAL

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 356 days.

(21) Appl. No.: 17/440,508

(22) PCT Filed: Mar. 5, 2020

(86) PCT No.: PCT/CN2020/077914
§ 371 (c)(1),
(2) Date: Sep. 17, 2021

(87) PCT Pub. No.: WO2020/192379
PCT Pub. Date: Oct. 1, 2020

(65) Prior Publication Data
US 2022/0158811 A1 May 19, 2022

(30) Foreign Application Priority Data
Mar. 22, 2019 (CN) .......................... 201910221840.3

(51) Int. Cl.
*H04L 5/00* (2006.01)
*H04W 4/40* (2018.01)
*H04W 72/30* (2023.01)

(52) U.S. Cl.
CPC ............ *H04L 5/0094* (2013.01); *H04W 4/40* (2018.02); *H04W 72/30* (2023.01)

(58) Field of Classification Search
CPC ........ H04L 5/0094; H04W 4/40; H04W 72/30
See application file for complete search history.

(56) References Cited

U.S. PATENT DOCUMENTS

2009/0225711 A1* 9/2009 Sammour ........... H04W 72/569
370/329
2018/0139770 A1* 5/2018 Ozturk ............... H04W 72/566
2018/0368133 A1 12/2018 Park et al.

FOREIGN PATENT DOCUMENTS

CN 106936918 A 7/2017
CN 108633079 A 10/2018
(Continued)

OTHER PUBLICATIONS

KRIPO Notice of Preliminary Rejection for corresponding KR Application No. 10-2021-7032250; dated May 25, 2023.
(Continued)

*Primary Examiner* — Mohammad S Anwar
(74) *Attorney, Agent, or Firm* — CANTOR COLBURN LLP

(57) ABSTRACT

A resource allocation method and device, a storage medium, and a terminal are provided. The method comprises: determining, based on a parameter configuration of a transmission resource and a parameter configuration of a logical channel, a first logical channel participating in a Logical Channel Prioritization (LCP); and allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

20 Claims, 2 Drawing Sheets

--- determining, based on a parameter configuration of a transmission resource and a parameter configuration of a logical channel, a first logical channel participating in a Logical Channel Prioritization — S101 allocating the transmission resource to a second logical channel of the first logical channel preferentially on the basis that the transmission resource is associated with a first resource, wherein the first resource comprises a feedback resource and/or a retransmission resource, and the second logical channel is used to transmit data requiring information feedback and/or data requiring retransmission — S102

(56) References Cited

FOREIGN PATENT DOCUMENTS

| | | |
|---|---|---|
| EP | 3051736 A1 | 8/2016 |
| EP | 3244677 A1 | 11/2017 |
| KR | 20170110069 A | 10/2017 |
| WO | 2009131099 A1 | 10/2009 |
| WO | WO-2009131099 A1 * 10/2009 | ........... H04L 1/0027 |
| WO | 2015021609 A1 | 2/2015 |

OTHER PUBLICATIONS

Spreadtrum Communications, "Logical channel prioritization Consideration"; 3GPP TSG-RAN WG2 Meeting #105; R2-1900933, Feb. 25 to Mar. 1, 2019; 3 pages.
EPO Extended European Search Report for corresponding EP Application No. 20779383.7; dated Apr. 5, 2022.
Samsung, "Configuration of Logical Channel Priority in NR"; 3GPP TSG RAN WG2 #98; R2-1705597; May 15-9, 2017; 3 pages.
International Search Report for International Application No. PCT/CN2020/077914; dated May 27, 2020.
JPO Notice of Reasons for Refusal for corresponding JP Application No. 2021-556709; dated Jan. 25, 2023.

* cited by examiner determining, based on a parameter configuration of a transmission resource and a parameter configuration of a logical channel, a first logical channel participating in a Logical Channel Prioritization ⸺ S101 allocating the transmission resource to a second logical channel of the first logical channel preferentially on the basis that the transmission resource is associated with a first resource, wherein the first resource comprises a feedback resource and/or a retransmission resource, and the second logical channel is used to transmit data requiring information feedback and/or data requiring retransmission ⸺ S102

FIG. 1 under 35 U.S.C. § 119(a) and 35 U.S.C. § 365(b) is claimed
RESOURCE ALLOCATION METHOD AND DEVICE, STORAGE MEDIUM AND TERMINAL

CROSS-REFERENCE TO RELATED APPLICATIONS

This is the national stage of International Application No. PCT/CN2020/077914, filed on Mar. 5, 2020, which. Priority under 35 U.S.C. § 119(a) and 35 U.S.C. § 365(b) is claimed from Chinese Patent Application No. 201910221840.3, filed on Mar. 22, 2019, and entitled "RESOURCE ALLOCATION METHOD AND DEVICE, STORAGE MEDIUM AND TERMINAL", the entire disclosure of which is also incorporated herein by reference.

TECHNICAL FIELD

The present disclosure generally relates to communication technology field, and more particularly, to a resource allocation method and device, storage medium and terminal.

BACKGROUND

Information exchange between the vehicle and the outside world (Vehicle to X, V2X for short, also known as vehicle to everything) is a key technology of the future intelligent transportation system, which mainly investigates the vehicle data transmission solution based on the 3rd Generation Partnership Project (3GPP) Communication Protocol. V2X communication includes Vehicle to Vehicle (V2V) communication, Vehicle to Infrastructure (V2I) communication, and Vehicle to Pedestrian (V2P) communication. V2X application can improve driving safety, reduce traffic jam and vehicle energy consumption, and improve transportation efficiency and in-vehicle Infotainment, etc.

In the Long Term Evolution (LTE) communication system, the V2X communication is based on broadcast communication and adopts a "one-to-all" communication mode. In this communication mode, a receiving terminal does not need to feedback to a sending terminal on whether the data is received successfully. If one time transmission is insufficient to meet the reliability requirement of a service, the sending terminal retransmit the data packet based on a preset number of times without feedback information.

In the 5th-Generation (5G) New Radio (NR, also known as New Air Interface) communication system, V2X communication with unicast is introduced, which adopts a "one-to-one" communication. In this case, the receiving terminal make a feedback on whether the data is received successfully to the sending terminal by ACKnowledgement/Non-ACKnowledgement (ACK/NACK) mechanism of the Hybrid Automatic Repeat reQuest (HARQ). Wherein, ACK indicates a successful reception and NACK indicates an unsuccessful reception. The sending terminal may conduct retransmission based on the unsuccessful reception. Compared with the retransmission without feedback information, the resource utilization can be improved under the retransmission with feedback information.

Retransmission mechanism can improve the successful rate of data transmission and the reliability of V2X service, nonetheless, not all V2X services need retransmission. Different V2X services have different requirements of reliability, which means there are services with high reliability requirement and services with low reliability requirement in V2X. Retransmission is not necessary for some V2X services, and one time transmission is sufficient to meet the reliability requirement of the service. For services do not require retransmission, there is no need for the receiving terminal to conduct data feedback. If a transmission resource is associated with a feedback resource and/or a retransmission resource, there is a need for a method for allocating the resource.

SUMMARY

Embodiments in the present disclosure provide a solution on how to optimize resource allocation when a transmission resource is associated with a feedback resource and/or a retransmission resource.

In an embodiment of the present disclosure, a method for resource allocation, includes: determining, based on a parameter configuration of a transmission resource and a parameter configuration of a logical channel, a first logical channel participating in a Logical Channel Prioritization (LCP); and allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

In an embodiment of the present disclosure, a device for resource allocation is provided, including: a determining circuitry, configured for determining a first logical channel participating in a Logical Channel Prioritization (LCP), based on a parameter configuration of a transmission resource and a parameter configuration of a logical channel; and a [[first]] allocation circuitry, configured for allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

In an embodiment of the present disclosure, a non-transitory storage medium storing one or more programs, the one or more programs comprising computer instructions, which, when executed by a processor, cause the processor to: determining, based on a parameter configuration of a transmission resource and a parameter configuration of a logical channel, a first logical channel participating in a Logical Channel Prioritization (LCP); and allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

BRIEF DESCRIPTION OF THE DRAWINGS

FIG. 1 schematically illustrates a process diagram of a method for resource allocation according to an embodiment of the present disclosure;

DETAILED DESCRIPTION

Figure 2:
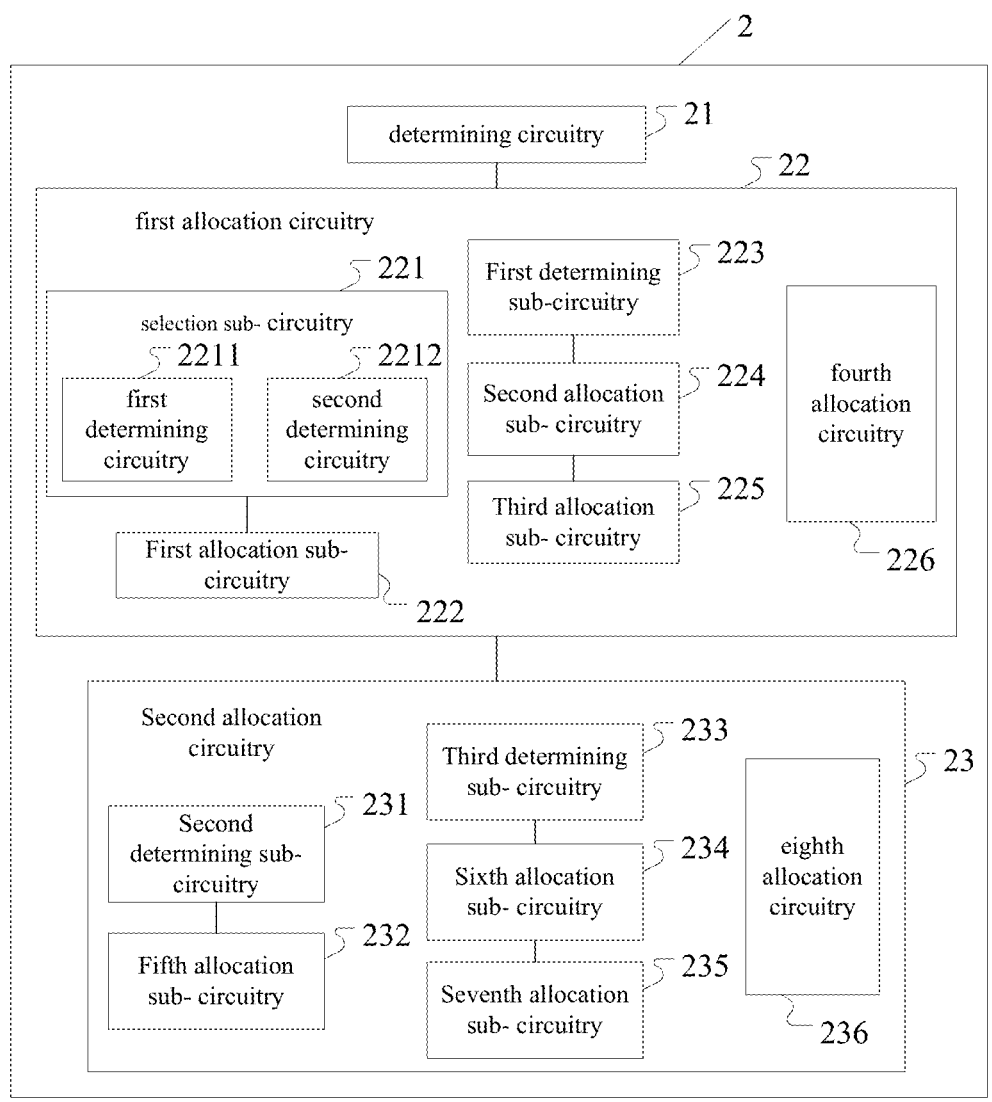
FIG. 2 schematically illustrates a structural diagram of a device for resource allocation according to an embodiment of the present disclosure.

As described in background, there is a need for a method for resource allocation when a transmission resource is associated with a feedback resource and/or a retransmission resource.

In NR V2X, there are two modes to obtain transmission resource: mode 1 and mode 2. In Mode 1, a sending terminal obtains a transmission resource from a base station, and then sends data to a receiving terminal by the obtained transmission resource. In mode 2, the sending terminal selects a resource that satisfying requirements from a set of resources for data transmission by perceiving or sensing. The resource may be the one not occupied by other User Equipments (UE), or the one occupied by other UEs but with little interference intensity.

Thereafter, if the receiving terminal needs to feedback, a radio resource is also needed to carry feedback information. In mode 1, a resource used for feedback is provided by the base station. In mode 2, a resource used for feedback is also selected from a set of resources by the sending terminal. If feedback is not required, the feedback resource is not required to be obtained, otherwise the feedback resource is wasted.

In V2X system, there are services with high reliability requirement and services with low reliability requirement, which correspond to services requiring feedback and services not requiring feedback, respectively. Furthermore, a transmission resource obtained by a sending terminal may or may not be associated with a feedback resource. If a service with high reliability requirement which requires feedback is placed on a transmission resource which is not associated with the feedback resource, a receiving terminal cannot feedback due to the lack of the feedback resource even if the reception fails, and the sending terminal cannot determine whether the service needs to be retransmitted according to a feedback information. If the sending terminal chooses not to retransmit and the receiving terminal fails to receive the service, the reliability of the service cannot be guaranteed. If the sending terminal chooses to retransmit and the receiving terminal receives the service successfully, the retransmission will result in a waste of resource.

Usually, a sending terminal may have a plurality of services requiring transmission. In these services, there are services with high reliability requirement and low reliability requirement. Regardless of whether the sending terminal obtains a transmission resource by the mode 1 or the mode 2, data belonging to different services and having different performance requirements need to be placed on the transmission resource, which is a Logical Channel Prioritization (LCP) process defined in the 3GPP protocol.

In V2X system, different services are embodied by different Logical Channels (LCH) and different Destinations. Each target may be associated with a plurality of logical channels, and each logical channel has a priority. The essence of the LCP process is, according to the priority of a logical channel, placing a service carried by the logical channel on a same transmission resource based on certain rules.

In LTE system, LCP process of V2X can be simply described in S0, S1, S2 and S3.

In S0, completing a logical channel selection. Specifically, based on a parameter configuration of a transmission resource and a parameter configuration of a logical channel, selecting a logical channel participating in the LCP process. For example, in V2X system, each logical channel may be transmitted on certain carriers, if the carrier to which the current transmission resource belongs is not a carrier allowed by a logical channel, the logical channel is excluded from current LCP process.

In S1, selecting a target address corresponding to a logical channel with a highest priority from a logical channel having candidate transmission data.

In S2, allocating a transmission resource to the logical channel with the highest priority and having candidate transmission data in the target address determined in S1.

In S3, if there is a remaining resource in the transmission resource, allocating the remaining resource to a logical channel corresponding to the target address in an order of priority from high to low, till the remaining resource is exhausted, or till the data in the logical channel is exhausted.

In conventional technology, the impact of a feedback resource or a retransmission resource on the resource allocation is not considered in the LCP process, which is unfavorable to improve the resource utilization.

A method for resource allocation is provided in the embodiments of the present disclosure, including: determining, based on a parameter configuration of a transmission resource and a parameter configuration of a logical channel, a first logical channel participating in the LCP; and if the transmission resource is associated with a first resource, allocating the transmission resource to a second logical channel of the first logical channel preferentially, wherein the first resource includes a feedback resource and/or a retransmission resource, and the second logical channel is used to transmit data requiring information feedback and/or data requiring retransmission.

The impact of a feedback resource or a retransmission resource on the resource allocation is considered in embodiments of the present disclosure, when a transmission resource is associated with a feedback resource and/or a retransmission resource, the transmission resource is allocated preferentially to a logical channel associated with data which is consistent with the characteristics of the transmission resource and requiring information feedback and/or requiring retransmission. Under this condition, if a receiving terminal receives a service with high reliability requirement requiring feedback, and the receiving terminal uses the transmission resource associated with the first resource, the receiving terminal sends the feedback information by a feedback resource associated with the transmission resource and a sending terminal retransmits the service by a retransmission resource when the receiving terminal fails to receive, so as to ensure the reliability of the service; if the receiving terminal receives a service with low reliability requirement without feedback, the sending terminal uses the transmission resource not associated with the first resource, which saves the resource and improves the resource utilization.

In order to clarify the object, characteristic and advantages of embodiments of the present disclosure, the embodiments of present disclosure will be described clearly in detail in conjunction with accompanying drawings.

Embodiments of the present disclosure are applicable for a 5G communication system, a 4G communication system, a 3G communication system, and various communication systems that are subsequently evolved.

Embodiments of the present disclosure are also applicable for different network architectures, including but not limited to a relay network architecture, a double-link network architecture, and a vehicle networking communication architecture.

A Base Station (BS) in embodiments of the present disclosure is also referred to as a base station equipment, which is deployed in a wireless access network to provide a wireless communication function. For example, devices in the 2G network that provide Base Station function include Base transceiver stations (BTS) and Base Station Controllers (BSC). Devices in the 3G network that provide Base Station function include Nodes B (Node B) and Radio Network Controllers (RNC). Devices in the 4G network that provide Base Station function include Evolved Nodes B (eNB). In the Wireless Local Area Network (WLAN), devices that provide Base Station function is Access Points (AP). Devices in the 5G New Radio (NR) that provide Base Station function include Nodes B that continues to evolve (gNB), and the Base Station also refers to devices in a new communication system that provide base station function in the future, and the like.

A terminal (for example, a sending terminal and/or a receiving terminal) in the embodiments of the present disclosure may refer to various forms of User Equipment (UE), access terminals, user units, user stations, Mobile Stations (MS), remote stations, remote terminals, mobile devices, user terminals, terminal equipments, wireless communication devices, user agents or user devices. The terminal device may also be a cellular phone, a cordless phone, a Session Initiation Protocol (SIP) phone, a Wireless Local Loop (WLL) station, a Personal Digital Assistant (PDA), a handheld device with the wireless communication function, a computing device or other processing devices connected to a wireless modem, vehicle equipments, wearable devices, terminal devices in the future 5G network, terminal devices in the future Public Land Mobile Network (PLMN), and the like, which is not limited in embodiments of the present disclosure.

A unidirectional communication link from an access network to a terminal is defined as a downlink in embodiments of the present disclosure, and data transmitted in the downlink is a downlink data, and a transmission direction of the downlink data is called a downlink direction; a unidirectional communication link from a terminal to an access network is defined as an uplink in embodiments of the present disclosure, and data transmitted in the uplink is an uplink data, and a transmission direction of the uplink data is called an uplink direction.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "a plurality of" appearing in the embodiments of the present disclosure refers to two or more.

The descriptions of "the first", "the second" and the like that appear in the embodiments of the present disclosure are only used to illustrate and distinguish objects described, and there is no order limitation, nor does it represents a special limitation on the number of devices in the embodiments of the present disclosure, and the descriptions cannot constitute any limitation to the embodiments of the present disclosure.

The "connection" appearing in the embodiments of the present disclosure refers to various connection methods such as a direct connection or a indirect connection, to implement communication between devices, which is not limited in the embodiments of the present disclosure.

The "network" and "system" appearing in some embodiment of the present disclosure express a same concept, and a communication system is a communication network.

The "require information feedback" in the embodiments of the present disclosure refers to transmit HARQ information based on a feedback resource.

The "requiring retransmission" in the embodiments of the present disclosure refers to perform transmission for at least one time under the preset maximum number of times of retransmission N times, and after the candidate transmission data is transmited for a first time, that is, the candidate transmission data is transmitted for at least two times, and at most N+1 times, and N is a positive integer.

FIG. 1 is a schematic process diagram of a method for resource allocation according to an embodiment of the present disclosure. The method for resource allocation can be executed by a terminal, for example, by a NR V2X UE. Specifically, the method for resource allocation includes S101 and S102.

In S101, determining, based on a parameter configuration of a transmission resource and a parameter configuration of a logical channel, a first logical channel participating in the LCP.

In S102, allocating the transmission resource to a second logical channel of the first logical channel preferentially on the basis that the transmission resource is associated with a first resource, wherein the first resource comprises a feedback resource and/or a retransmission resource, and the second logical channel is used to transmit data requiring information feedback and/or data requiring retransmission.

More specifically, in S101, a terminal selects the logical channel based on a parameter configuration information of a transmission resource and a parameter configuration information of a logical channel, to obtain a logical channel participating in the LCP process (for example, a first logical channel, the first logical channel may include a plurality of logical channels).

Wherein, the transmission resource being associated with the first resource refers to that the transmission resource has a corresponding relationship with the first resource. In a specific implementation, a transmission resource used for a first transmission and a feedback resource used to transmit feedback information are allocated together and have a corresponding relationship, or, a transmission resource used for the first transmission and a retransmission resource used for retransmission are allocated together and having a corresponding relationship. For example, the transmission resource together with the first resource are transmitted to a sending terminal by a Base Station, and the transmission resource is adopted to transmit candidate transmission data by the sending terminal, if the candidate transmission data is not received correctly by a receiving terminal, HARQ information is transmitted to the sending terminal based on the first resource by the receiving terminal. For another example, the transmission resource together with the first resource are sent to the sending terminal by a Base Station, and the candidate transmission data is sent by the sending terminal based on the transmission resource, and the candidate transmission data is retransmitted to a receiving terminal by the sending terminal based on the first resource.

In S102, the terminal determines the second logical channel, and after determining that the transmission resource is associated with the first resource, allocating the transmission resource to the second logical channel preferentially. Wherein, the first resource includes a feedback resource, or a retransmission resource or refers to a feedback resource and a retransmission resource. The second logical channel is a part of channels in the first logical channel, and the second logical channel can be used to transmit data requiring information feedback and/or data requiring retransmission.

In a specific implementation, the S102 includes S1021 and S1022.

In S1021, selecting the second logical channel from the first logical channel as a logical channel participating in the LCP;

In S1022, allocating the transmission resource to the logical channel participating in the LCP.

Specifically, in S1021, if the transmission resource is associated with the first resource, the first logical channel can be selected by the terminal again, and the second logical channel can be selected from the first logical channel by the terminal as the logical channel participating in the LCP process.

Thereafter, the transmission resource can be allocated to the logical channel participating in the LCP in S1022 by the terminal.

In some embodiment, a logical channel of enable-HARQ can be determined as the second logical channel by the terminal, wherein the logical channel of enable-HARQ is a logical channel requiring HARQ feedback. When the first resource includes a feedback resource and/or a retransmission resource, it means that the transmission resource is associated with the feedback resource and/or the retransmission resource. With this, the logical channel of enable-HARQ can be determined from the first logical channel as a logical channel participating in the LCP process by the terminal.

In some embodiment, a first logical channel with a maximum number of times of retransmission not greater than N can be determined as the second logical channel by the terminal. When the first resource includes N number of retransmission resources, it means that the transmission resource is associated with N number of retransmission resources. With this, the second logical channel can be determined from the first logical channel as the logical channel participating in the LCP process by the terminal, and N is a positive integer.

In some embodiment, a first logical channel with a maximum number of times of retransmission not greater than N can be selected as the second logical channel by the terminal. When the first resource includes N number of feedback resources, it means that the transmission resource is associated with N number of feedback resources. With this, the second logical channel can be determined from the first logical channel as the logical channel participating in the LCP process by the terminal, and N is a positive integer.

Those skilled in the art can understand that logical channels usually have priorities. When the first logical channel is selected by the terminal as a logical channel after logical channel selecting, the S102 may include S1023 and S1024.

In S1023, when at least one logical channel in the second logical channel has candidate transmission data, the target associated with the second logical channel having the highest priority is determined in the at least one logical channel.

In S1024, when the target is associated with a plurality of second logical channels having candidate transmission data, the transmission resource is allocated to the plurality of second logical channels having candidate transmission data in an order of priority from high to low.

Specifically, in S1023, when the plurality of second logical channels having candidate transmission data participates in the LCP, a logical channel with the highest priority can be selected. Thereafter, the target associated having a logical channel with the highest priority can be further determined.

In S1024, if the determined target address is associated with a plurality of second logical channels having candidate transmission data, the transmission resource can be allocated to the plurality of second logical channels having candidate transmission data by the terminal in an order of the priority from high to low.

Thereafter, if the transmission resource still has unallocated remaining resource, the remaining resource can be allocated to a third logical channel which is associated with the target and has candidate transmission data by the terminal in an order of priority from high to low, till all the remaining resource is allocated, or till all the candidate transmission data is allocated.

In some embodiment, a logical channel of enable-HARQ is determined as the second logical channel, when a plurality of second logical channels having candidate transmission data participates in the LCP, a logical channel having the highest priority can be selected. Thereafter, the target associated with the logical channel having the highest priority can be further determined.

Thereafter, if the determined target is associated with a plurality of second logical channels having candidate transmission data, the transmission resource can be allocated to the plurality of second logical channels having candidate transmission data by the terminal in an order of priority from high to low.

Thereafter, if the transmission resource still has unallocated remaining resource, the remaining resource can be allocated to a third logical channel which is associated with the target and has candidate transmission data by the terminal in an order of priority from high to low, till all the remaining resource is allocated, or till all the candidate transmission data is allocated. Wherein, the third logical channel refers to the remaining logical channel in the first logical channel except for the second logical channel. The third logical channel is used to transmit data without information feedback and/or data without retransmission.

In some embodiment, if the transmission resource is associated with the first resource, the transmission resource is allocated according to a priority of the logical channel, but when the first logical channel includes logical channels with a same priority, the transmission resource is allocated preferentially to the second logical channel in the first logical channel by the terminal. For example, when a second logical channel and a third logical channel have a same priority, the transmission resource is allocated to the second logical channel in the first logical channel by the terminal preferentially. Thereafter, if there is a remaining resource, the remaining resource is allocated to remaining logical channels in an order of priority from high to low. Each logical channel in the first logical channel has a priority.

For example, the first logical channel includes logical channels LCH1, LCH2, LCH3 and LCH4. LCH1 has the highest priority, LCH2 has the same priority as LCH3, which is lower than the priority of LCH1 and higher than the priority of LCH4. In addition, LCH3 is a second logical channel, and LCH2 is a remaining logical channel. At this time, the transmission resource is allocated to LCH1 preferentially according to the priority, thereafter, because LCH3 is the second logical channel, LCH3 is prioritized, then LCH2 and finally LCH4, to allocate the remaining transmission resource.

In some embodiment, if the transmission resource is not associated with the first resource, the transmission resource is allocated to a third logical channel in the first logical channel preferentially, the third logical channel is used to transmit data without HARQ feedback and/or data without retransmission. Data without HARQ feedback means that there is no feedback resource and the HARQ feedback is not performed. The without retransmission means that there is no retransmission resource and the retransmission is not performed.

In some embodiment, if the transmission resource is not associated with the first resource, a third logical channel in the first logical channel is selected as a logical channel participating in the LCP process by the terminal, with the second logical channel in the first logical channel excluded. Thereafter, the transmission resource is allocated to the logical channel participating in the LCP process by the terminal.

In some embodiment, if the transmission resource is not associated with the first resource, when at least one logical channel in the third logical channels has candidate transmission data, the logical channel having the highest priority in the third logical channel is determined by the terminal, and further, a target associated with the logical channel having the highest priority is determined. Thereafter, when the target is associated with a plurality of third logical channels having candidate transmission data, the transmission resource is allocated to the plurality of third logical channels having candidate transmission data in the order of the priority from high to low. Wherein, the third logical channel has a priority.

After allocating the transmission resource to the plurality of third logical channels having candidate transmission data, if the transmission resource still has unallocated remaining resource, the remaining resource can be allocated to the second logical channel which is associated with the target and has candidate transmission data by the terminal in an order of the priority from high to low, till all the remaining resource is allocated, or till all the candidate transmission data is allocated.

In some embodiment, if the transmission resource is not associated with the first resource, the transmission resource is allocated according to the priority of the logical channel, but when the first logical channel includes logical channels with a same priority, the transmission resource is allocated to the third logical channel in the first logical channel preferentially by the terminal. For example, when the second logical channel and the third logical channel have a same priority, the transmission resource is allocated to the third logical channel in the first logical channel preferentially by the terminal. Thereafter, if there is still a remaining resource, the remaining resource is allocated to the second logical channels in an order of priority from high to low. Each logical channel in the first logical channel has a priority.

For example, the first logical channel includes logical channels LCH1, LCH2, LCH3 and LCH4. LCH1 has the highest priority, LCH2 has the same priority as LCH3, which is lower than the priority of LCH1 and higher than the priority of LCH4. In addition, LCH3 is a third logical channel, and LCH2 is a remaining logical channel. At this time, the transmission resource is allocated to LCH1 preferentially according to the priority, thereafter, because LCH3 is the third logical channel, LCH3 is prioritized, then LCH2 and finally LCH4, to allocate the remaining transmission resource.

Specific embodiments are described below in detail.

Specific Embodiment One

If a transmission resource is not associated with a feedback resource and/or a retransmission resource, a logical channel of non-enable-HARQ can be considered as the only logical channel participating in the LCP process. Wherein, data transmitted by the logical channel of enable-HARQ is data requiring feedback and/or data requiring retransmission.

In some embodiment, if the transmission resource is associated with the feedback resource and/or the retransmission resource, a logical channel of enable-HARQ can be considered as the only logical channel participating in the LCP process.

In some embodiment, if the transmission resource is associated with N number of retransmission resources (N is a natural number), the logical channel with retransmission times not greater than the number of retransmission resources can be considered as the only logical channel participating in the LCP process. Preferably, the logical channel with retransmission times equal to the number of retransmission resources can be considered as the logical channel participating in the LCP process.

In some embodiment, if times of retransmission of the transmission resource is specified as N (N is a natural number), a logical channel associated with the transmission resource with times of retransmission not greater than N is considered as the logical channel participating in the LCP process. In some embodiment, a logical channel associated with the transmission resource with times of retransmission equal to N is considered as the logical channel participating in the LCP process.

Those skilled in the art can understand that a logical channel that does not require feedback is not necessarily the logical channel that does not require retransmission. For example, in a blind retransmission scenario, even if there is no feedback information, the candidate transmission data is still retransmitted by the sending terminal based on a preset times of retransmission. In this case, the data does not require feedback resource during a transmission process, but a retransmission resource and a logical channel associated with the retransmission resource is still required to retransmit the data.

According to embodiments of the present disclosure, the selecting conditions of a logical channel is added. When a transmission resource is associated with a feedback resource and/or a retransmission resource, a logical channel that does not meet the feedback requirement or the retransmission requirement can be excluded in the LCP process, which helps ensure the transmission reliability of service and improves the resource utilization.

Specific Embodiment Two (1) A transmission resource is associated with a feedback resource and/or a retransmission resource.

In S1, after selecting a logical channel participating in the LCP process using the conventional technology, if a sending terminal has a logical channel of enable-HARQ, and at least one logical channel of enable-HARQ has candidate transmission data, a logical channel with the highest priority is selected from the logical channel of enable-HARQ having candidate transmission data according to the priority, thereafter, a target address is obtained based on the logical channel with the highest priority, and the target address is associated with the logical channel;

In S2, if the logical channel corresponding to the target address determined in S1 contains a plurality of logical channels of enable-HARQ having candidate transmission data, a transmission resource is allocated to a logical channel with the highest priority among the plurality of logical channels of enable-HARQ having candidate transmission data;

In S3, if the transmission resource still has a remaining resource (for example, called a first remaining resource), the first retaining resource is allocated to the logical channel of enable-HARQ having candidate transmission data corresponding to the target address in an order of priority from high to low;

In S4, if there is still a remaining resource (for example, called a second remaining resource), the second remaining resource is allocated to the logical channel of non-enable-HARQ having candidate transmission data corresponding to the target address in an order of priority from high to low, till all the remaining resource is allocated, or till all the candidate transmission data is allocated. That is, all the candidate transmission data is allocated to the corresponding transmission resource.

(2) A transmission resource is not associated with a feedback resource and/or a retransmission resource.

In S1, after selecting the logical channel participating in the LCP process with the conventional technology, if a sending terminal has a logical channel of non-enable-HARQ, and at least one logical channel of non-enable-HARQ has candidate transmission data, a logical channel with the highest priority is selected from the at least one logical channel of the non-enable-HARQ having candidate transmission data according to the priority, thereafter, a target address is obtained based on a highest priority of a logical channel. Wherein, the logical channel of the non-enable-HARQ transmits data without feedback and/or data without retransmission;

In S2, if the logical channel which is corresponding to the target address determined in S1 contains a plurality of logical channels of non-enable-HARQ having candidate transmission data, a transmission resource is allocated to a logical channel with a highest priority in the plurality of logical channels of non-enable-HARQ having candidate transmission data;

In S3, if the transmission resource still has a remaining resource (for example, called a first remaining resource), the first retaining resource is allocated to the logical channel of non-enable-HARQ having candidate transmission data corresponding to the target address in an order of priority from high to low;

In S4, in some embodiment, if there is still a remaining resource (for example, called a second remaining resource), the second remaining resource is allocated to the logical channel of enable-HARQ having candidate transmission data corresponding to the target address in an order of priority from high to low, till all the remaining resource is allocated, or till all the candidate transmission data is allocated.

According to embodiments of the present disclosure, a logical channel participating in the LCP process is determined based on a logical channel selecting conditions in the conventional technology, a transmission resource is allocated to the logical channel which has a same characteristics as the transmission resource preferentially (for example, when a transmission resource is associated with a feedback resource, a logical channel is associated with the feedback resource, and the transmission resource and the logical channel have a same characteristics), which is favorable to improve the resource utilization.

Specific Embodiment Three

According to embodiments of the present disclosure, a logical channel participating in the LCP process is determined based on a logical channel selecting conditions in the conventional technology.

(1) A transmission resource is associated with a feedback resource and/or a retransmission resource.

In S1, after selecting a logical channel participating in the LCP process using the conventional technology, a logical channel with a highest priority is determined according to priority, when the logical channel with the highest priority includes a logical channel of enable-HARQ, the logical channel of enable-HARQ with the highest priority is selected, thereafter, a target address associated with the selected logical channel is obtained based on the selected logical channel;

In S2, if the logical channel corresponding to the target address determined in S1 contains a plurality of logical channels having candidate transmission data, a logical channel with a highest priority is determined from the plurality of logical channels having candidate transmission data, when a logical channel which is corresponding to the target address and has the highest priority in the logical channels having candidate transmission data includes a logical channel of enable-HARQ, the logical channel of enable-HARQ with the highest priority having candidate transmission data is selected from the logical channels corresponding to the target address, thereafter, a transmission resource is allocated to the selected logical channel;

In S3, if the transmission resource still has a remaining resource, in an order of the priority from high to low, the retaining resource is allocated to the logical channel of enable-HARQ having candidate transmission data corresponding to the target address, when the priority are the same, the remaining resource is allocated to the logical channel of enable-HARQ preferentially, till all the remaining resource is allocated, or till all the candidate transmission data is allocated (that is, all the candidate transmission data is allocated to the corresponding transmission resource).

(2) A transmission resource is not associated with a feedback resource and/or a retransmission resource.

In S1, after selecting a logical channel participating in the LCP process using the conventional technology, a logical channel with a highest priority is determined according to priority, when the logical channel with the highest priority includes a logical channel of non-enable-HARQ, a logical channel of non-enable-HARQ with a highest priority is selected, thereafter, a target address associated with the selected logical channel is obtained based on the selected logical channel.

In S2, if the logical channel corresponding to the target address determined in S1 contains a plurality of logical channels having candidate transmission data, a logical channel with a highest priority is determined from the plurality of logical channels having candidate transmission data, when a logical channel which is corresponding to the target address and has the highest priority in the logical channels having candidate transmission data includes a logical channel of non-enable-HARQ, the logical channel of non-enable-HARQ with the highest priority having candidate transmission data is selected from the plurality of logical channels corresponding to the target address, thereafter, a transmission resource is allocated to the selected logical channel.

In S3, if the transmission resource still has a remaining resource, in an order of priority from high to low, the retaining resource is allocated to the logical channel of non-enable-HARQ having candidate transmission data corresponding to the target address, when the priority are the same, the remaining resource is allocated to a logical channel of non-enable-HARQ, till all the remaining resource is allocated, or till all the candidate transmission data is allocated (that is, all the candidate transmission data is allocated to the corresponding transmission resource).

In embodiments of the present disclosure, resource is allocated based on the priority of the logical channel, a transmission resource is allocated to a logical channel of enable-HARQ or a logical channel of non-enable-HARQ which has a same characteristics as the transmission resource preferentially, which is favorable to meet the delay requirement of data transmission and improve the resource utilization.

FIG. 2 is a schematic structural diagram of a device for resource allocation according to an embodiment of the present disclosure. The device for resource allocation 2 implements the method according to an embodiment shown in FIG. 1 and the method is executed by a terminal, for example, may be executed by a V2X terminal.

Specifically, the device for resource allocation 2 includes: a determining circuitry 21, adapted to determine a first logical channel participating in the LCP based on a parameter configuration of a transmission resource and a parameter configurations of a logical channel; a first allocation circuitry 22, if the transmission resource is associated with a first resource, the first allocation circuitry 22 is adapted to allocate the transmission resource to a second logical channel in the first logical channel preferentially, wherein the first resource includes a feedback resource and/or a retransmission resource, and the second logical channel is used to transmit data requiring information feedback and/or data requiring retransmission.

In some embodiment, the first allocation circuitry 22 includes: a selection sub-circuitry 221, adapted to select the second logical channel from the first logical channel as a logical channel participating in the LCP; a first allocation sub-circuitry 222, adapted to allocate the transmission resource to the logical channel participating in the LCP.

In some embodiment, the first resource includes N number of retransmission resources, the selection sub-circuitry 221 includes: a first determining circuitry 2211, adapted to select a second logical channel with a maximum number of times of retransmission not greater than N in the first logical channel as the logical channel participating in the LCP when the transmission resource is associated with N number of retransmission resources, and N is a positive integer.

In some embodiment, the first resource includes N number of feedback resources, and the selection sub-circuitry 221 includes: a second determining circuitry 2212, adapted to select a logical channel of enable-HARQ with a maximum number of retransmission not greater than N in the first logical channel as the logical channel participating in the LCP when the transmission resource is associated with N number of feedback resources, and N is a positive integer.

In some embodiment, the second logical channel has a priority, the first allocation circuitry 22 includes: a first determining sub-circuitry 223, adapted to determine a target associated with the second logical channel having the highest priority in the at least one logical channel when the at least one logical channel in the second logical channel has candidate transmission data; a second allocation sub-circuitry 224, adapted to allocate the transmission resource to a plurality of second logical channels having candidate transmission data in an order of priority from high to low when the target is associated with the plurality of second logical channels having candidate transmission data.

In a specific implementation, the device for resource allocation 2 also includes: a third allocation sub-circuitry 225, if there are unallocated remaining resource after allocating the transmission resource to the plurality of second logical channels having candidate transmission data, adapted to allocate the remaining resource to a third logical channel which is associated with the target and has candidate transmission data in an order of priority from high to low, till all the remaining resource is allocated, or till all the candidate transmission data is allocated, and the third logical channel is adapted to transmit data without information feedback and/or without retransmission.

In some embodiment, each logical channel in the first logical channel has a priority, the first allocation circuitry 22 includes: a fourth allocation sub-circuitry 226, adapted to allocate the transmission resource to a second logical channel preferentially when the second logical channel and a remaining logical channel have the same priority in the first logical channel.

The device for resource allocation 2 also includes: a second allocation circuitry 23. If the transmission resource is not associated with the first resource, the second allocation circuitry 23 is adapted to allocate the transmission resource to a third logical channel in the first logical channel preferentially, the third logical channel is adapted to transmit data without information feedback and/or without retransmission.

In a specific implementation, the second allocation circuitry 23 includes: a second determining sub-circuitry 231, adapted to select the third logical channel from the first logical channel as a logical channel participating in the LCP; a fifth allocation sub-circuitry 232, adapted to allocate the transmission resource to the logical channel participating in the LCP.

In some embodiment, the third logical channel has a priority, the second allocation circuitry 23 includes: a third determining sub-circuitry 233, adapted to determine a target associated with the third logical channel having the highest priority in the at least one logical channel when the at least one logical channel in the third logical channels has candidate transmission data; a sixth allocation sub-circuitry 234, adapted to allocate the transmission resource to a plurality of third logical channels having candidate transmission data in an order of priority from high to low when the target is associated with the plurality of third logical channels having candidate transmission data.

Further, the second allocation circuitry 23 also includes: a seventh allocation sub-circuitry 235, if there are unallocated remaining resources after allocating the transmission resources to the plurality of third logical channels having the candidate transmission data, adapted to allocate the transmission resource to a second logical channel which is associated with the target and has candidate transmission data, till all the remaining resource is allocated, or till all the candidate transmission data is allocated.

In some embodiment, each logical channel in the first logical channel has a priority, the second allocation circuitry 23 includes: an eighth allocation sub-circuitry 236, adapted to allocate the transmission resource to a third logical channel preferentially, when the second logical channel and the third logical channel have a same priority in the first logical channel.

Principles and detailed operation of the device for resource allocation 2 can be found in the above descriptions of the method as shown in FIG. 1, and thus are not described hereinafter.

Further, in an embodiment of the present disclosure, a storage medium having computer instructions stored therein is provided, wherein once the computer instructions are executed, the above method as shown in FIG. 1 is performed. In some embodiment, the storage medium may include a non-volatile or non-transitory memory or the like.

The storage medium includes a Read Only Memory (ROM), a Random Access Memory (RAM), a magnetic disk, an optical disk or the like.

Further, in an embodiment of the present disclosure, a terminal including a memory and a processor is provided, wherein the memory has computer instructions stored therein, and when the processor executes the computer instructions, the above method as shown in FIG. 1 is performed. In some embodiment, the terminal may be a NR V2X UE.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for resource allocation, comprising:
   determining, based on a parameter configuration of a transmission resource and a parameter configuration of a logical channel, a first logical channel participating in a Logical Channel Prioritization (LCP); and
   allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

2. The method according to claim 1, wherein said allocating the transmission resource to the third logical channel of the first logical channel preferentially comprises:
   selecting the third logical channel from the first logical channel as a logical channel participating in the LCP; and
   allocating the transmission resource to the logical channel participating in the LCP.

3. The method according to claim 1, wherein the third logical channel has a priority, wherein said allocating the transmission resource to the third logical channel of the first logical channel preferentially comprises:
- determining a target which is associated with the third logical channel having a highest priority in at least one logical channel, on the basis that the at least one logical channel in the third logical channel has candidate transmission data; and
- allocating the transmission resource to a plurality of third logical channels having candidate transmission data in an order of priority from high to low, on the basis that the target is associated with the plurality of third logical channels having candidate transmission data.

4. The method according to claim 3, wherein after allocating the transmission resource to the plurality of third logical channels having candidate transmission data, the resource allocation method further comprises:
- allocating unallocated remaining resource to a second logical channel associated with the target and having candidate transmission data in an order of priority from high to low, on the basis that there is still unallocated remaining resource among the transmission resource, till the unallocated resource is exhausted, or till the candidate transmission data is exhausted, and the second logical channel is used to transmit data requiring information feedback and/or data requiring retransmission.

5. The method according to claim 1, wherein each logical channel of the first logical channel has a priority, said allocating the transmission resource to the third logical channel of the first logical channel preferentially comprises:
- allocating the transmission resource to the third logical channel preferentially, on the basis that a second logical channel and the third logical channel have a same priority in the first logical channel, and the second logical channel is used to transmit data requiring information feedback and/or data requiring retransmission.

6. The method according to claim 1, further comprising:
- allocating the transmission resource to a second logical channel of the first logical channel preferentially on the basis that the transmission resource is associated with the first resource, wherein the second logical channel is used to transmit data requiring information feedback and/or data requiring retransmission.

7. The method according to claim 6, wherein said allocating the transmission resource to the second logical channel of the first logical channel preferentially comprises:
- selecting the second logical channel from the first logical channel as a logical channel participating in the LCP; and
- allocating the transmission resource to the logical channel participating in the LCP.

8. The method according to claim 7, wherein the first resource includes N number of retransmission resources, wherein said selecting the second logical channel from the first logical channel as the logical channel participating in the LCP comprises:
- selecting the second logical channel with a maximum number of times of retransmission not greater than N from the first logical channel as the logical channel participating in the LCP, on the basis that the transmission resource is associated with N number of retransmission resources, and N is a positive integer.

9. The method according to claim 7, wherein the first resource includes N number of feedback resources, wherein said selecting the second logical channel from the first logical channel as the logical channel participating in the LCP comprises:
- selecting the second logical channel with a maximum number of times of retransmission not greater than N from the first logical channel as the logical channel participating in the LCP, on the basis that the transmission resource is associated with N number of feedback resources, and N is a positive integer.

10. The method according to claim 6, wherein the second logical channel has a priority, wherein said allocating the transmission resource to the second logical channel of the first logical channel preferentially comprises:
- determining a target which is associated with a second logical channel having a highest priority in at least one logical channel, on the basis that at least one of the second logical channel has candidate transmission data; and
- allocating the transmission resource to a plurality of second logical channels having candidate transmission data in an order of priority from high to low, on the basis that the target is associated with the plurality of second logical channels having candidate transmission data.

11. The method according to claim 10, wherein after allocating the transmission resource to the plurality of second logical channels having candidate transmission data, the method for resource allocation further comprises:
- allocating a remaining resource to the third logical channel associated with the target and having transmission data in an order of priority from high to low, on the basis that there is still unallocated remaining resource among the transmission resource, till the unallocated resource is exhausted, or till the candidate transmission data is exhausted.

12. The method according to claim 6, wherein each logical channel of the first logical channel has a priority, said allocating the transmission resource to a second logical channel of the first logical channel preferentially comprises:
- allocating the transmission resource to the second logical channel preferentially, on the basis that there are other logical channels having a same priority as the priority of the second logical channel in the first logical channel.

13. A device for resource allocation, comprising:
- a determining circuitry, configured for determining a first logical channel participating in a Logical Channel Prioritization (LCP), based on a parameter configuration of a transmission resource and a parameter configuration of a logical channel; and
- a second allocation circuitry, configured for allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

14. A non-transitory storage medium storing one or more programs, the one or more programs comprising instructions, which, when executed by a processor, cause the processor to:
- determining, based on a parameter configuration of a transmission resource and a parameter configuration of a logical channel, a first logical channel participating in a Logical Channel Prioritization (LCP); and allocating the transmission resource to a third logical channel in the first logical channel preferentially, on the basis that the transmission resource is not associated with a first resource, wherein the first resource comprises a feedback resource and/or a retransmission resource, and the third logical channel is used to transmit data without information feedback and/or data without retransmission.

15. The non-transitory storage medium according to claim 14, wherein said allocating the transmission resource to the third logical channel of the first logical channel preferentially comprises:
    selecting the third logical channel from the first logical channel as a logical channel participating in the LCP; and
    allocating the transmission resource to the logical channel participating in the LCP.

16. The non-transitory storage medium according to claim 14, wherein the third logical channel has a priority, and said allocating the transmission resource to the third logical channel of the first logical channel preferentially comprises:
    determining a target which is associated with the third logical channel having a highest priority in at least one logical channel, on the basis that the at least one logical channel in the third logical channel has candidate transmission data; and
    allocating the transmission resource to a plurality of third logical channels having candidate transmission data in an order of priority from high to low, on the basis that the target is associated with the plurality of third logical channels having candidate transmission data.

17. The non-transitory storage medium according to claim 14, wherein each logical channel of the first logical channel has a priority, and said allocating the transmission resource to the third logical channel of the first logical channel preferentially comprises:
    allocating the transmission resource to the third logical channel preferentially, on the basis that a second logical channel and the third logical channel have a same priority in the first logical channel, and the second logical channel is used to transmit data requiring information feedback and/or data requiring retransmission.

18. The non-transitory storage medium according to claim 14, further comprising:
    allocating the transmission resource to a second logical channel of the first logical channel preferentially on the basis that the transmission resource is associated with the first resource, wherein the second logical channel is used to transmit data requiring information feedback and/or data requiring retransmission.

19. The non-transitory storage medium according to claim 18, wherein said allocating the transmission resource to the second logical channel of the first logical channel preferentially comprises:
    selecting the second logical channel from the first logical channel as a logical channel participating in the LCP; and
    allocating the transmission resource to the logical channel participating in the LCP.

20. The non-transitory storage medium according to claim 18, wherein the second logical channel has a priority, and said allocating the transmission resource to the second logical channel of the first logical channel preferentially comprises:
    determining a target which is associated with a second logical channel having a highest priority in at least one logical channel, on the basis that at least one of the second logical channel has candidate transmission data; and
    allocating the transmission resource to a plurality of second logical channels having candidate transmission data in an order of priority from high to low, on the basis that the target is associated with the plurality of second logical channels having candidate transmission data.

* * * * *